(12) United States Patent
Reber et al.

(10) Patent No.: US 9,284,047 B2
(45) Date of Patent: Mar. 15, 2016

(54) ROUTINGS FOR ARTICULATED LANDING GEAR

(71) Applicant: Goodrich Corporation, Charlotte, NC (US)

(72) Inventors: Korey M. Reber, Independence, OH (US); Derek C. Milsom, Oakville (CA)

(73) Assignee: GOODRICH CORPORATION, Charlotte, NC (US)

( * ) Notice: Subject to any disclaimer, the term of this patent is extended or adjusted under 35 U.S.C. 154(b) by 412 days.

(21) Appl. No.: 13/957,765

(22) Filed: Aug. 2, 2013

(65) Prior Publication Data

US 2015/0034762 A1 Feb. 5, 2015

(51) Int. Cl.
*B64C 25/00* (2006.01)
*B64C 25/02* (2006.01)

(52) U.S. Cl.
CPC ............... *B64C 25/02* (2013.01); *B64C 25/001* (2013.01)

(58) Field of Classification Search
CPC ........ B64C 25/52; B64C 25/00; B64C 25/14; B64C 25/10; B64C 25/16; B64C 25/405; B64C 25/02; B64C 25/001
USPC ................................ 244/100 R, 102 R, 102 A
See application file for complete search history.

(56) References Cited

U.S. PATENT DOCUMENTS

| | | | | |
|---|---|---|---|---|
| 2,318,568 A | * | 5/1943 | Wintermute | B64C 25/60 244/102 R |
| 2,587,628 A | * | 3/1952 | King | 73/11.04 |
| 3,273,382 A | * | 9/1966 | Fonash | 73/767 |
| 3,401,388 A | * | 9/1968 | Phillips | 342/58 |
| 3,517,550 A | * | 6/1970 | Leventhal | 73/764 |
| 3,532,307 A | | 10/1970 | Larson | |
| 3,712,122 A | * | 1/1973 | Harris et al. | 340/945 |
| 3,946,358 A | * | 3/1976 | Bateman | 340/970 |
| 4,278,219 A | * | 7/1981 | Finance | 244/100 R |
| 4,302,827 A | * | 11/1981 | Rosenblum | 367/116 |
| 4,528,564 A | * | 7/1985 | Trampnau | 340/946 |
| 4,770,372 A | * | 9/1988 | Ralph | 244/102 R |
| 4,869,444 A | * | 9/1989 | Ralph | 244/104 FP |
| 4,979,154 A | * | 12/1990 | Brodeur | 367/116 |

(Continued)

FOREIGN PATENT DOCUMENTS

| | | |
|---|---|---|
| EP | 1382526 | 1/2004 |
| WO | 0104003 | 1/2001 |

(Continued)

OTHER PUBLICATIONS

Extended European Search Report dated Feb. 5, 2015 in European Application No. 14170821.4.

*Primary Examiner* — Brian M O'Hara
*Assistant Examiner* — Assres H Woldemaryam
(74) *Attorney, Agent, or Firm* — Snell & Wilmer LLP

(57) ABSTRACT

An articulated landing gear may include electrical lines and/or hydraulic lines located within the articulated landing gear. The articulated landing gear may have a hollow structural post and a hollow trailing arm coupled by a pivot joint. The electrical lines and/or hydraulic lines may be routed through an interior of the hollow structural post and through an interior of the hollow trailing arm. A bulkhead within the hollow structural post or the hollow trailing arms may include guide holes. The electrical lines and/or hydraulic lines may be supported by the bulkhead by passing through the guide holes. The electrical lines and/or hydraulic lines may be flexible around the pivot joint.

19 Claims, 4 Drawing Sheets

(56) References Cited

U.S. PATENT DOCUMENTS

| | | | | |
|---|---|---|---|---|
| 5,214,586 A * | 5/1993 | Nance | | 701/124 |
| 5,260,702 A * | 11/1993 | Thompson | | 340/970 |
| 5,406,487 A * | 4/1995 | Tanis | | 701/16 |
| 5,511,430 A * | 4/1996 | Delest et al. | | 73/802 |
| 5,548,517 A * | 8/1996 | Nance | | 701/124 |
| 6,012,001 A * | 1/2000 | Scully | | 701/16 |
| 6,024,145 A * | 2/2000 | Ackles | | 144/382 |
| 6,128,951 A * | 10/2000 | Nance | | 73/178 T |
| 6,588,282 B2 * | 7/2003 | Arms | | 73/786 |
| 6,676,075 B2 * | 1/2004 | Cowan et al. | | 244/100 R |
| 7,274,310 B1 * | 9/2007 | Nance | | 340/960 |
| 7,589,645 B2 * | 9/2009 | Schmidt | | 340/960 |
| 7,944,372 B2 * | 5/2011 | Gouette et al. | | 340/960 |
| 8,042,765 B1 * | 10/2011 | Nance | | 244/100 R |
| 8,091,481 B1 * | 1/2012 | Floyd | | 102/377 |
| 8,180,504 B1 * | 5/2012 | Nance | | 701/5 |
| 8,359,930 B2 * | 1/2013 | Gago Tripero et al. | | 73/760 |
| 8,565,965 B2 * | 10/2013 | Nance | | 701/34.1 |
| 8,565,968 B2 * | 10/2013 | Nance | | 701/37 |
| 8,903,572 B1 * | 12/2014 | Hagelin et al. | | 701/16 |
| 9,008,871 B2 * | 4/2015 | Jones et al. | | 701/16 |
| 2005/0033489 A1 * | 2/2005 | Tezuka | | 701/16 |

FOREIGN PATENT DOCUMENTS

| | | |
|---|---|---|
| WO | 2012004594 | 1/2012 |
| WO | 2012080426 | 6/2012 |

* cited by examiner

US 9,284,047 B2

ROUTINGS FOR ARTICULATED LANDING GEAR

FIELD

The present disclosure relates to landing gear, and more particularly, to routings for articulated landing gear.

BACKGROUND

Landing gear supports an aircraft while on the ground. An articulated landing gear may include a hollow interior volume. Various electrical lines and/or hydraulic lines may be attached to the exterior of the landing gear. The electrical lines and/or hydraulic lines may transmit electrical signals and/or hydraulic pressure between the aircraft and the wheels and brakes of the landing gear. The electrical lines and/or hydraulic lines may also be used to detect various positional sensors on the landing gear. However, the electrical lines and/or hydraulic lines may cause noise and turbulence while the aircraft is in motion. Additionally, electrical lines and/or hydraulic lines on the exterior of the landing gear may be susceptible to damage from debris, for example in the event of a tire burst, bird strike, etc.

SUMMARY

In various embodiments, an articulated landing gear may comprise a structural post and a trailing arm. The trailing arm may be coupled to the structural post at a pivot joint. At least one of an electrical line and a hydraulic line may be located within the structural post and the trailing arm. The at least one of an electrical line and a hydraulic line may comprise a first rigid portion within the structural post, a flexible portion between the structural post and the trailing arm, and a second rigid portion within the trailing arm.

In various embodiments, an articulated landing gear may comprise a hollow structural post and a first bulkhead located within the hollow structural post. At least one of an electrical line and a hydraulic line may pass through a first guide hole in the first bulkhead. The articulated landing gear may further comprise a hollow trailing arm coupled to the hollow structural post. The hollow trailing arm may comprise a second bulkhead located within the hollow trailing arm. The at least one of an electrical line and a hydraulic line may pass through a second guide hole in the second bulkhead.

In various embodiments, a system for routing at least one of an electrical line and a hydraulic line may comprise a structural post, a trailing arm coupled to the structural post at a pivot joint, and a bulkhead located within at least one of the structural post and the trailing arm. The bulkhead may secure the at least one of an electrical line and a hydraulic line. The at least one of an electrical line and a hydraulic line may comprise a first rigid portion within the structural post, a flexible portion around the pivot joint, and a second rigid portion within the trailing arm.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
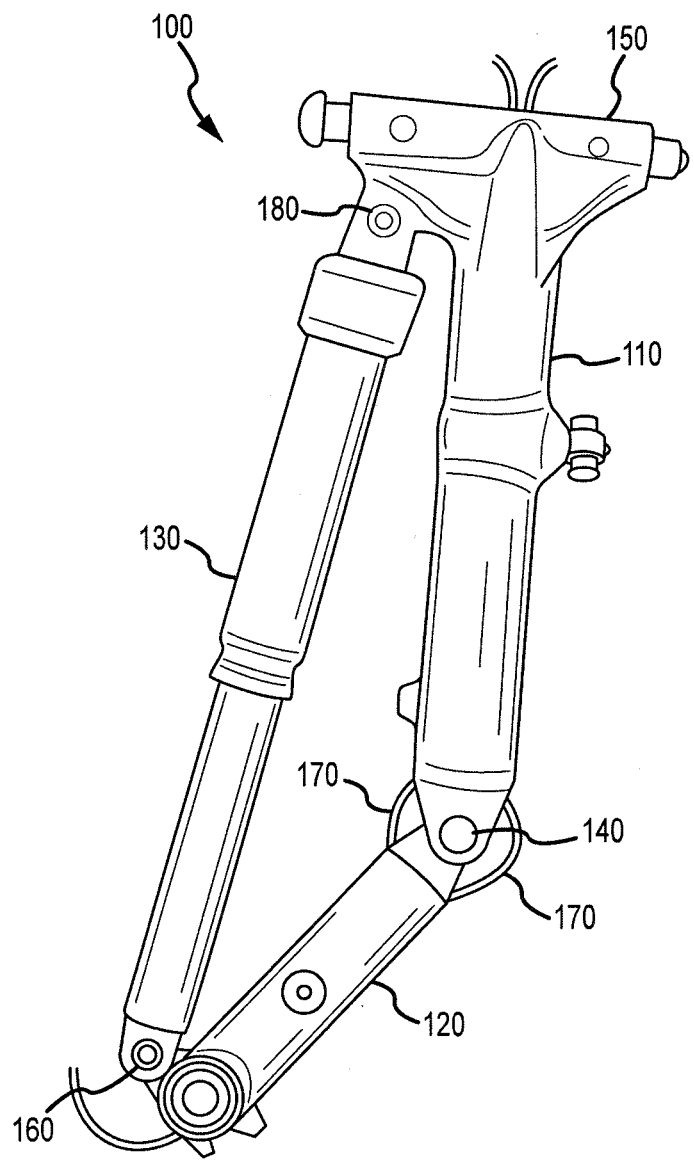
FIG. 1 illustrates, in accordance with various embodiments, a side view of a portion of an articulated landing gear.

Referring to FIG. 1, a portion of an articulated landing gear 100 is illustrated according to various embodiments. Articulated landing gear 100 may comprise structural post 110, trailing arm 120, and shock strut 130. Structural post 110 may be coupled to trailing arm 120 via pivot joint 140. Shock strut 130 may be coupled to structural post 110 at upper post 150 via strut joint 180, and shock strut 130 may be coupled to trailing arm 120 at arm joint 160. In various embodiments, structural post 110 and upper post 150 may comprise a single structural component. Articulated landing gear 100 may further comprise electrical lines and/or hydraulic lines 170. Electrical lines and/or hydraulic lines 170 may be located at least partially within structural post 110 and trailing arm 120.

Articulated landing gear 100 supports the weight of an aircraft while on ground. An upward force from one or more wheels in contact with the ground may transfer to articulated landing gear 100 at arm joint 160. The force may cause shock strut 130 to compress, and trailing arm 120 to rotate about pivot joint 140 relative to structural post 110. Additionally, shock strut 130 may pivot relative to structural post 110 at strut joint 180. Electrical lines and/or hydraulic lines 170 may bend at pivot joint 140 as trailing arm 120 rotates.

In various embodiments, structural post 110 and trailing arm 120 may comprise hollow tubing. In various embodiments, the tubing may comprise steel, however in various embodiments the tubing may comprise any material capable of supporting the weight of an aircraft. Due to the hollow nature of structural post 110 and trailing arm 120, various components, such as electrical lines and/or hydraulic lines 170, may be routed through structural post 110 and trailing arm 120. Routing components through structural post 110 and trailing arm 120 may protect the components from debris, reduce drag, and reduce noise from components outside of structural post 110 and trailing arm 120.

Electrical lines and/or hydraulic lines 170 may transmit power and/or electrical signals through articulated landing gear 100. Electrical lines and/or hydraulic lines 170 may comprise lines that carry electrical signals, such as electrical brake lines, temperature sensor lines, wheel speed transducer lines, proximity sensor lines, etc. Electrical lines and/or hydraulic lines 170 may comprise lines that carry hydraulic fluid under pressure, such as hydraulic brake lines, etc. In various embodiments, electrical lines and/or hydraulic lines 170 may be substantially rigid lines located within structural post 110 and/or trailing arm 120. For example, electrical lines and/or hydraulic lines 170 may comprise metal tubing, such as aluminum, steel, or copper. Rigid electrical lines and/or hydraulic lines 170 may provide increased durability and reliability over flexible electrical lines and/or hydraulic lines. Between structural post 110 and trailing arm 120, electrical lines and/or hydraulic lines 170 may be substantially flexible in order to allow movement in response to trailing arm 120 rotating relative to structural post 110. In various embodiments, electrical lines and/or hydraulic lines 170 may be flexible throughout structural post 110, trailing arm 120, and between structural post 110 and trailing arm 120. In various embodiments, electrical lines and/or hydraulic lines 170 may be routed on the side of pivot joint 140 where an obtuse angle is formed by structural post 110 and trailing arm 120, on the side of pivot joint 140 where a reflex angle is formed by structural post 110 and trailing arm 120, or both. The reflex angle side may allow for a larger bend radius for electrical lines and/or hydraulic lines 170, however, the reflex angle side may also result in a greater length of electrical lines and/or hydraulic lines 170 being exposed outside of the structural post 110 and trailing arm 120, resulting in more noise, threat exposure, and drag than on the obtuse angle side. In various embodiments, the flexible portions of electrical lines and/or hydraulic lines 170 may be coupled to the rigid portions of electrical lines and/or hydraulic lines 170 via one or more fittings. Thus, in various embodiments, the flexible portions of electrical lines and/or hydraulic lines 170 may be replaced without requiring the rigid portions of electrical lines and/or hydraulic lines 170 to be replaced and/or removed from articulated landing gear 100.

Electrical lines and/or hydraulic lines 170 may be routed through upper post 150 to interface with an airframe. Articulated landing gear 100 may retract into the airframe body by rotating at upper post 150. By routing electrical lines and/or hydraulic lines 170 internally through upper post 150 to the airframe, the possibility of electrical lines and/or hydraulic lines 170 pinching or bending too severely may be reduced during retraction of articulated landing gear 100.

Figure 2:
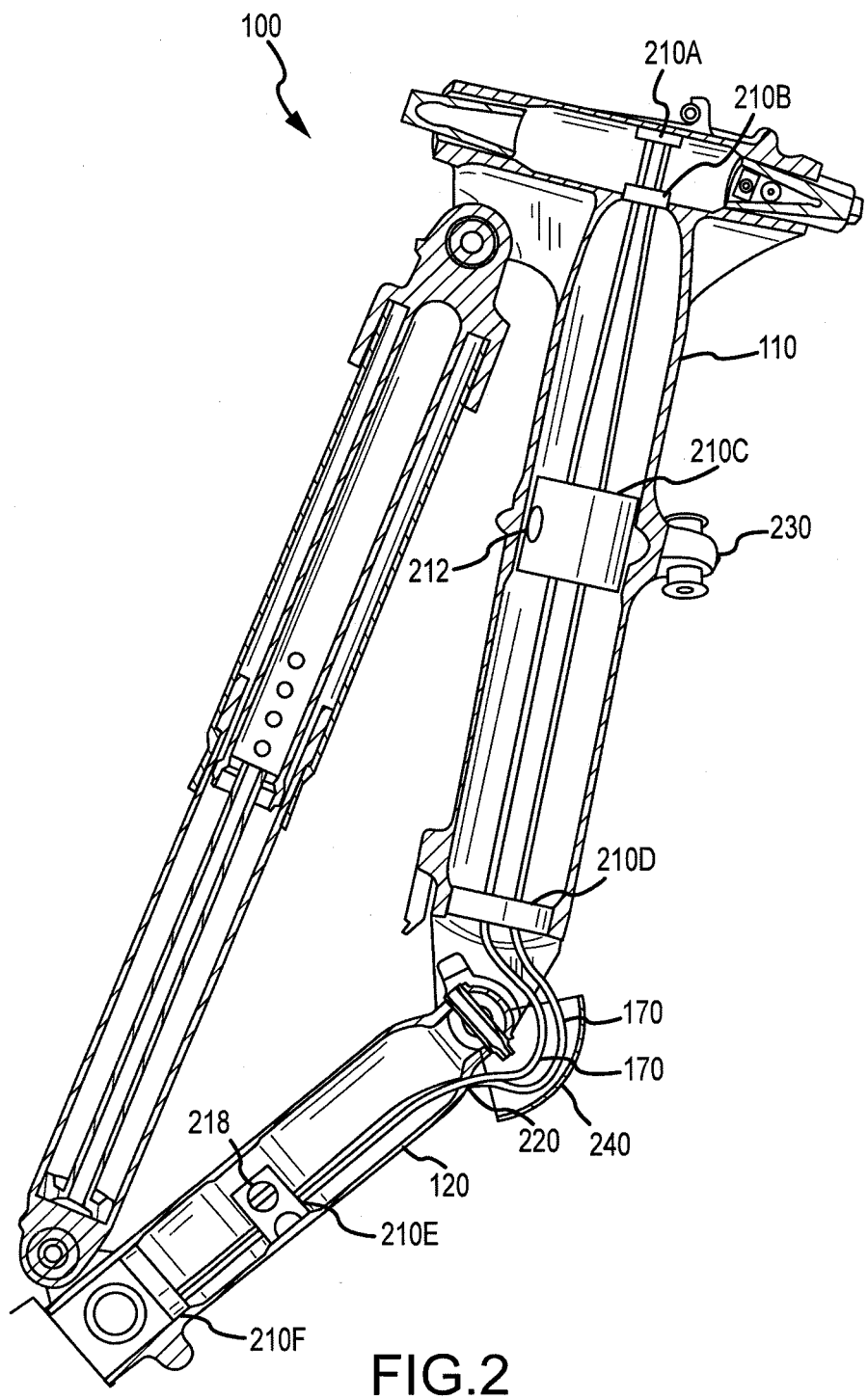
FIG. 2 illustrates, in accordance with various embodiments, a side view of the internal structure of an articulated landing gear.

Referring to FIG. 2, an internal view of articulated landing gear 100 is illustrated according to various embodiments. Structural post 110 may be at least partially hollow. In various embodiments, electrical lines and/or hydraulic lines 170 may be unsupported throughout at least one of structural post 110 and trailing arm 120. However, in various embodiments, electrical lines and/or hydraulic lines 170 may be supported by at least one bulkhead 210A, 210B, 210C, 210D, 210E, and 210F.

In various embodiments, bulkheads 210A, 210B, 210C, 210D, 210E, and 210F may support electrical lines and/or hydraulic lines 170 and prevent damage or failure from movement, such as vibrations. In various embodiments, bulkheads 210A, 210B, 210C, 210D, 210E, and 210F may be substantially cylindrical. Bulkheads 210A, 210B, 210C, 210D, 210E, and 210F may be kept in place by friction. For example, bulkheads 210A, 210B, 210C, 210D, 210E, and 210F may comprise expandable compression joints. In various embodiments, bulkheads 210A, 210B, 210C, 210D, 210E, and 210F may comprise a compressible material, such that, in response to being placed within structural post 110 or trailing arm 120, contact between bulkheads 210A, 210B, 210C, 210D, 210E, and 210F and structural post 110 or trailing arm 120 keeps bulkheads 210A, 210B, 210C, 210D, 210E, and 210F in a fixed position. It may be desirable for bulkheads 210A, 210B, 210C, 210D, 210E, and 210F to be comprised of a lightweight material. Thus, in various embodiments, bulkheads 210A, 210B, 210C, 210D, 210E, and 210F may be comprised of a polymer or carbon composite. In various embodiments, pins or screws may be used to secure bulkheads 210A, 210B, 210C, 210D, 210E, and 210F in place. In various embodiments, bulkheads 210A, 210B, 210C, 210D, 210E, and 210F may be coupled to fittings integral to electrical lines and/or hydraulic lines 170 in order to keep bulkheads 210A, 210B, 210C, 210D, 210E, and 210F in place.

In various embodiments, articulated landing gear 100 may comprise a brace attach spindle pin 230. Brace attach spindle pin 230 may extend through pin hole 212 of bulkhead 210C in order to secure bulkhead 210 in place. Brace attach spindle pin 230 may couple a locking side brace actuator to the structure of articulated landing gear 100. The side brace actuator may lock in a gear down position to maintain articulated landing gear 100 in a down and locked position, and the side brace actuator may retract articulated landing gear 100 into an airframe. Articulated landing gear 100 may further comprise brake pin bulkhead 210E. Brake pin bulkhead 210E may comprise brake pin 218 which secures brake pin bulkhead 210E in place. Brake pin 218 may prevent a brake from rotating about an axle in response to brake torque being applied. In various embodiments, brace attach spindle pin 230 and/or brake pin 218 may support one or more bulkheads 210A through 210F.

Trailing arm 120 may comprise a reinforced exit 220. Reinforced exit 220 may be a hole in the wall of trailing arm 120 which allows electrical lines and/or hydraulic lines 170 to pass between an interior of trailing arm 120 and the exterior area around pivot joint 140. Reinforced exit 220 may be environmentally sealed to prevent gas or fluids from entering or leaving trailing arm 120 through reinforced exit 220. In various embodiments, structural post 110 may also comprise a reinforced exit near bulkhead 210A. In various embodiments, the flexible portion of electrical lines and/or hydraulic lines 170 may be exposed to the elements between trailing arm 120 and structural post 110. However, in various embodiments, articulated landing gear 100 may comprise a deflector 240 around pivot joint 140 which protects the flexible portion of electrical lines and/or hydraulic lines 170 and may reduce noise from turbulence caused by electrical lines and/or hydraulic lines 170.

Figure 3:
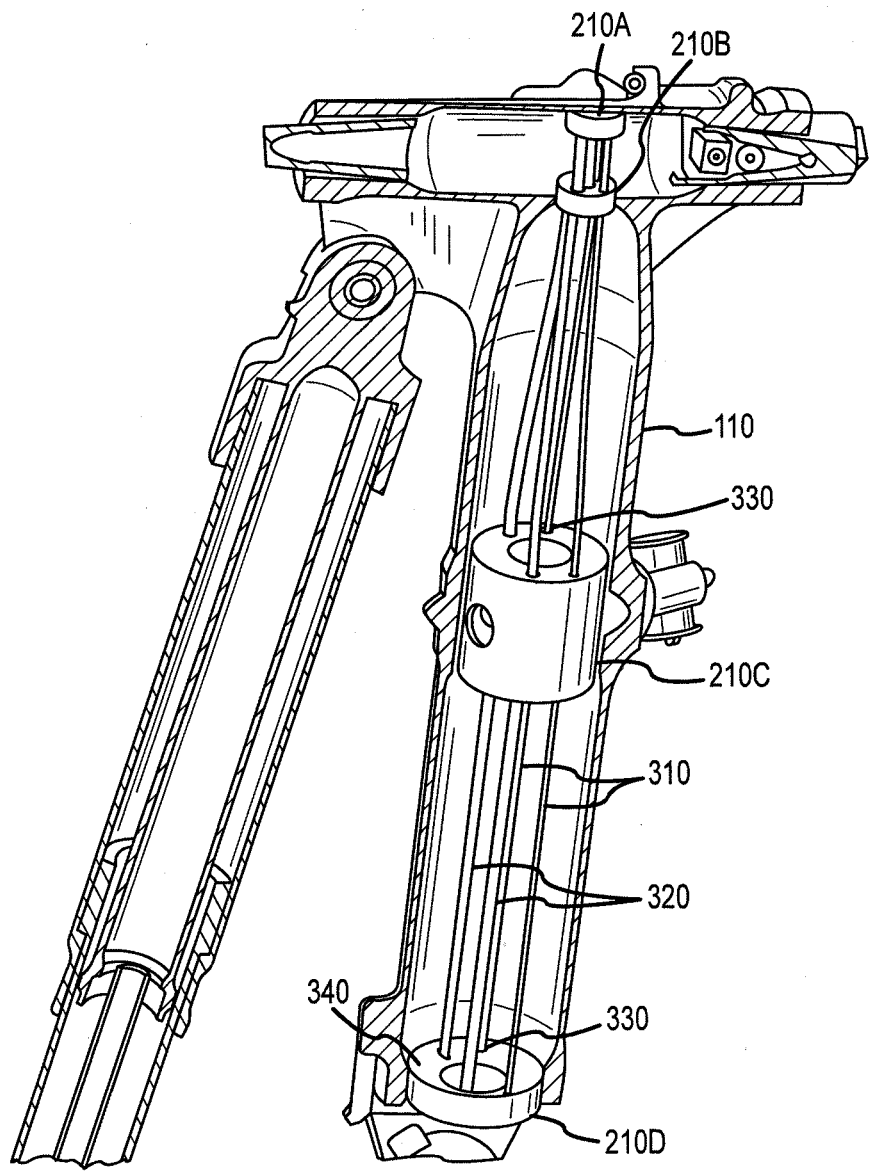
FIG. 3 illustrates, in accordance with various embodiments, a perspective view of the internal structure of a structural post.

Referring to FIG. 3, a perspective view of the interior of structural post 110 is illustrated according to various embodiments. As illustrated, structural post 110 comprises two electrical lines 310 and two hydraulic lines 320 in the interior of structural post 110. However, structural post 110 may comprise any number of electrical lines and hydraulic lines. Electrical lines 310 and hydraulic lines 320 pass through guide holes 330 in bulkheads 210A through 210F. Guide holes 330 may prevent movement of electrical lines 310 and hydraulic lines 320 in order to prevent damage. In various embodiments, at least one bulkhead 210D may comprise an upper surface 340 which is slanted downward towards the center of structural post 110. The slanted upper surface 340 may allow fluids to drain through structural post 110 without accumulating on upper surface 340.

Figure 4:
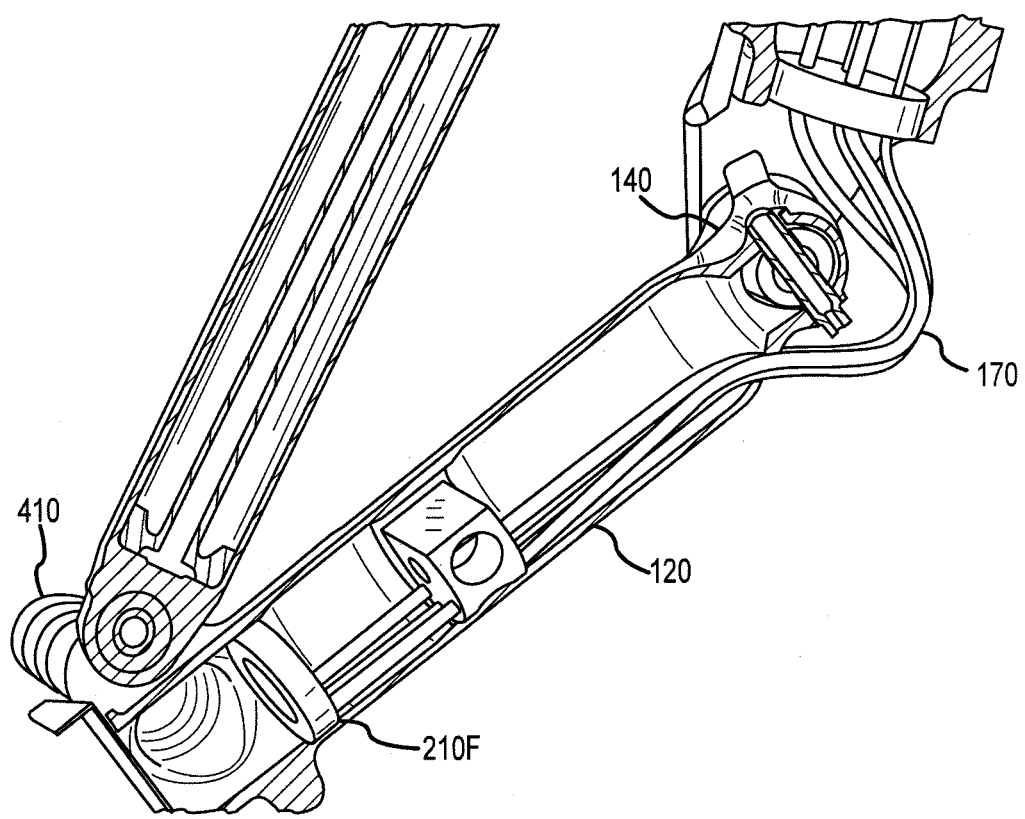
FIG. 4 illustrates, in accordance with various embodiments, a perspective view of the internal structure of a trailing arm.

Referring to FIG. 4, trailing arm 120 is illustrated coupled to axle 410 according to various embodiments. In various embodiments, electrical lines and/or hydraulic lines 170 may be rigid within trailing arm 120. In various embodiments, flexible electrical lines and/or hydraulic lines may be located within axle 410, and the flexible electrical lines and/or hydraulic lines may couple to electrical lines and/or hydraulic lines 170 at bulkhead 210F.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An articulated aircraft landing gear comprising:
a structural post;
a trailing arm coupled to the structural post, wherein the structural post and the trailing arm are pivotably coupled at a pivot joint;
an electrical line located at least partially within the structural post and located at least partially within the trailing arm;
a hydraulic line comprising a first metallic portion located at least partially within an interior of the structural post, a second metallic portion located at least partially within an interior of the trailing arm, and a flexible portion coupled to the first metallic portion and the second metallic portion, wherein the flexible portion is routed around a reflex angle side of the pivot joint; and
a deflector configured to protect the flexible portion around the pivot joint.

2. The articulated landing gear of claim 1, wherein the electrical line comprises a first portion located within the structural post, a second portion located between the structural post and the trailing arm, and a third portion located within the trailing arm.

3. The articulated landing gear of claim 2, wherein the first portion of the electrical line is metallic, and wherein the second portion of the electrical line comprises at least one of a polymer and rubber.

4. The articulated landing gear of claim 2, wherein the first portion of the electrical line is rigid and the second portion of the electrical line is flexible.

5. The articulated landing gear of claim 1, further comprising a bulkhead located within at least one of the structural post or the trailing arm.

6. The articulated landing gear of claim 5, wherein the bulkhead comprises a guide hole, and wherein at least one of the electrical line or the hydraulic line travels through the guide hole.

7. The articulated landing gear of claim 1, wherein at least one of the trailing arm or the structural post comprises a reinforced exit.

8. The articulated landing gear of claim 1, wherein at least one of the structural post or the trailing arm comprises a hollow tube.

9. The articulated landing gear of claim 1, wherein an upper surface of a bulkhead located in the structural post slants downward toward a center of the structural post.

10. An aircraft landing gear comprising:
a hollow structural post;
a first bulkhead located within an interior of the hollow structural post; and
an electrical line and a hydraulic line, wherein the hydraulic line passes through a first guide hole in the first bulkhead,
wherein the hydraulic line comprises a first metallic portion located at least partially within the first guide hole, a second metallic portion, and a flexible portion coupled to the first metallic portion and the second metallic portion.

11. The landing gear of claim 10, further comprising a hollow trailing arm coupled to the hollow structural post.

12. The landing gear of claim 11, wherein the hollow trailing arm comprises a second bulkhead located within the hollow trailing arm, wherein the hydraulic line passes through a second guide hole in the second bulkhead.

13. The landing gear of claim 11, wherein the hydraulic line is exposed between the hollow structural post and the hollow trailing arm.

14. The landing gear of claim 10, wherein the electrical line passes through the first bulkhead.

15. The landing gear of claim 10, wherein the first bulkhead is secured to the hollow structural post by a brace attach spindle pin.

16. A system for routing an electrical line and a hydraulic line in an aircraft landing gear comprising:
- a structural post;
- a trailing arm coupled to the structural post at a pivot joint; and
- a bulkhead located within an interior of at least one of the structural post and the trailing arm; wherein the bulkhead secures the electrical line and the hydraulic line,
- wherein the hydraulic line comprises a first metallic portion located at least partially within the bulkhead, a second metallic portion, and a flexible portion coupled to the first metallic portion and the second metallic portion, wherein the flexible portion is routed around a reflex angle side of the pivot joint.

17. The system of claim 16, wherein the electrical line comprises a first rigid portion located within the structural post, a flexible portion located around the pivot joint, and a second rigid portion located within the trailing arm.

18. The system of claim 17, wherein the flexible portion of the electrical line is exposed around the pivot joint.

19. The system of claim 18, further comprising a deflector which protects the flexible portion of the electrical line around the pivot joint.

* * * * *